United States Patent [19]

Aoto

[11] Patent Number: 5,050,857
[45] Date of Patent: Sep. 24, 1991

[54] DEVICE FOR ORIENTING A SHEET

[75] Inventor: Teruaki Aoto, Obu, Japan

[73] Assignee: Meinan Machinery Works, Inc., Obu, Japan

[21] Appl. No.: 454,687

[22] Filed: Dec. 21, 1989

[30] Foreign Application Priority Data

Dec. 26, 1988 [JP] Japan .................................. 63-168495

[51] Int. Cl.⁵ ............................................. B65H 9/06
[52] U.S. Cl. .................................. 271/227; 271/236; 271/250
[58] Field of Search ............... 271/227, 240, 238, 250, 271/236

[56] References Cited

U.S. PATENT DOCUMENTS

| | | | |
|---|---|---|---|
| 3,603,446 | 9/1971 | Maxey | 271/227 X |
| 3,713,647 | 1/1973 | Tamura | 271/250 X |
| 4,052,054 | 10/1977 | Cardwell | 271/227 |
| 4,591,143 | 5/1986 | Jeschke | 271/227 |

FOREIGN PATENT DOCUMENTS 6030008 11/1978 Japan .

Primary Examiner—Richard A. Schacher
Attorney, Agent, or Firm—Brooks Haidt Haffner & Delahunty

[57] ABSTRACT

There is disclosed a device for orienting a sheet having a rectangular shape into a straight position. A sheet, which is fed forward in a position inclined in one way and then brought into contact engagement at one corner on the leading edge thereof with one of two working surfaces of the device is turned into a straight position by the feeding force acting on the sheet to move it forward and of the force of a working surface of the device acting on that corner to move it in a direction perpendicular to that of the feeding force and away from the other corner on the same leading edge of the sheet. The device includes feeding rollers for feeding the veneer sheet forward, and first and second driven sheet orienting belts or sets of vertical rollers, each disposed at the downstream end of the sheet feeding area and providing a working surface which moves either one of the corners on the leading edge of the sheet in the direction that causes the sheet to be turned into the desired straight position in conjunction with the feeding force.

10 Claims, 7 Drawing Sheets

DEVICE FOR ORIENTING A SHEET

FIELD OF THE INVENTION

The present invention relates to a device for orienting a sheet. More particularly it relates to a device for correcting an inclined position of the leading edge of an incoming rectangular-shaped sheet, such as a veneer sheet, plywood panel or the like by orienting it into a straight position in which the leading edge is presented perpendicular to the direction in which the sheet is fed.

BACKGROUND OF THE INVENTION

In the process of laying-up an odd number of veneer sheets to form an assembly of such sheets which are to be glued together thereby to form a plywood panel, each veneer sheet should desirably be provided in a specifically oriented position, e.g. a position in which the sheet is straightened with respect to a given reference direction, for making possible an efficient and accurate laying-up operation. As is known to those skilled in the art, such oriented positioning of veneer sheets in progress is convenient and desirable for ease of handling sheets in processes other than the laying-up process in the manufacture of plywood panels.

A device for controlling the position of a veneer sheet is disclosed by Publication of Examined Japanese Utility Model Application No. 60-30008 (1985) which is assigned to the same assignee as that in the present patent application. This device includes a plurality of feeding rolls for feeding a veneer sheet in a specific direction and a pair of freely rotatable rolls provided at the downstream end of the feeding area with their axes upright and perpendicular to a feeding plane in which the veneer sheet is fed by the feeding rolls and spaced across the feeding direction at an interval which is smaller than the width dimension of a veneer sheet whose inclined position is to be corrected. In such device, if a veneer sheet is fed in a non-straight position with its leading edge inclined with respect to a straight line perpendicular to the feeding direction, the leading edge of such incoming veneer sheet is firstly brought into contact engagement with either one of the two rolls and the veneer sheet is guided laterally by that one roll which is then in rolling contact with the leading edge. Because the veneer sheet is continued to be moved forward by the feeding rolls while being guided laterally, the sheet is caused to be turned until the leading edge is brought into contact engagement with the other roll, where the sheet is straightened with respect to the direction in which it has been fed by the feeding rolls.

In the above device, the two rolls are required to be rotated easily by the rolling contact of the leading edge of the veneer sheet for allowing the sheet to be turned with smoothness. In other words, if the rotational resistance of the rolls is greater than the feeding force imparted to the veneer sheet by the feeder, the rolls cannot be rotated or rolled by the leading edge, so that the sheet may fail to be turned properly and, therefore, to be positioned in the desired straight alignment. Such failure in positioning tends to occur particularly in handling thin veneer sheets whose weight is light and, therefore, the magnitude of the feeding force of which may be too small to cause the rolls to rotate. Under such conditions, the veneer sheet tends to be deformed or bent upwardly without being positioned properly.

Additionally, because each of the freely rotatable rolls in the above device can start rotating only after the leading edge of the veneer sheet has been brought into contact therewith and the roll is thus subjected to the feeding force of the sheet, it takes a relatively long time before the sheet is positioned completely straight.

SUMMARY OF THE INVENTION

It is an object of the present invention to remove the above disadvantages of the prior art by providing a device which is capable of properly orienting even a thin sheet into alignment with the direction of feeding or movement in a shorter time.

In the device according to the present invention, a sheet which is fed in a non-straight position inclined in one way and then brought into contact engagement at one corner on the leading edge side thereof with one of two oppositely drivable working surfaces of the device is caused to be turned or oriented into a straight position by the feeding force acting on the sheet to move it forward and by the force of the driver working surface acting on the engaged corner to move the leading edge in a lateral direction perpendicular to that of the feeding force and away from the other corner on the same leading edge of the sheet. For this purpose, the device of the invention includes means for feeding a veneer sheet forward by imparting the feeding force to the sheet, and first and second orienting means disposed at the downstream end of a feeding area defined by the feeding means for providing the above two working surfaces each of which applies a lateral force to either one of the corners on the leading edge of the sheet travelling in the longitudinal direction that causes the sheet to be turned as required in conjunction with the feeding force.

The first orienting means has its working surface engageable with one of the corners on the leading edge of the sheet when the sheet is fed forward in a position inclined in one way, while the second orienting means has its working surface similar to that of the first working surface, but engageable with the other corner of said leading edge when the sheet is fed in a position inclined in the other way. The two working surfaces are movable in opposite directions away from each other, whereby a sheet which is fed with its leading edge in an inclined position comes into contact engagement at either of its corners with its corresponding working surface is turned straight or oriented by the two forces acting on the veneer sheet in two different directions as described above.

In the preferred embodiment, the first and second orienting means include a pair of endless belts each of which is mounted between two pulleys in such a way that part of the belt surface faces the feeding area and allows the leading edge of the sheet to be brought into contact engagement therewith. The two endless belts are driven to rotate in such opposite directions that the above-mentioned parts of the surfaces of the two belts move away from each other.

The above and other objects, features and advantages of the present invention will become apparent to those skilled in the art from the following description of embodiments of the device according to the invention, which description is made with reference to the accompanying drawing, wherein:

DETAILED DESCRIPTION OF THE PREFERRED EMBODIMENT

Figure 1:
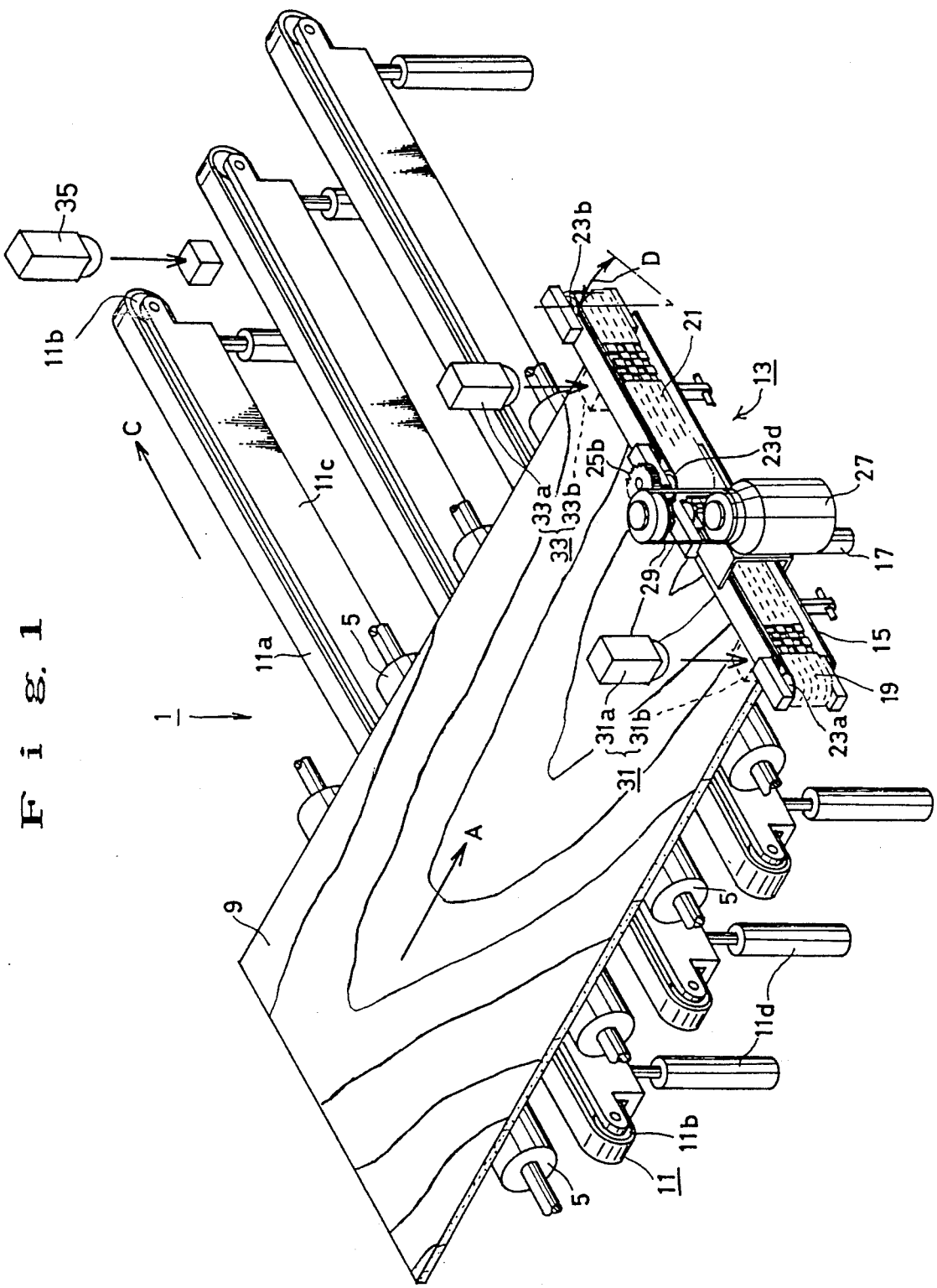
FIG. 1 is a perspective view showing a preferred embodiment of the device according to the present invention for orienting an incoming veneer sheet.

Referring firstly to FIG. 1 illustrating the preferred embodiment of an orienting device according to the invention generally designated by reference numeral 1, a plurality of feeding rolls 5 are provided spaced in parallel to each other at given intervals and rotatably supported by a frame (not shown) of the orienting device 1. All the feeding rolls 5 are constantly driven by a motor (not shown) mounted on the same frame (not shown) to rotate in the direction which causes a veneer sheet 9 to move in the longitudinal arrow direction "A". To permit the veneer sheet 9 to be fed positively with as little slippage as possible, each feeding roll 5 should advantageously be clad on its periphery with rubber so as to increase the frictional resistance to the relative motion between the feeding roll and the veneer sheet.

Between each two adjacent feeding rolls 5 is disposed a lateral delivery conveyer 11 which includes an endless belt 11a trained over and between a pair of pulleys 11b rotatably supported by a support member 11c. Though not shown specifically in the drawing, the pulleys 11b on either side of the support members 11c are driven constantly by a motor (not shown) so that all the delivery belts 11a run at the same speed. As will be described in detail hereinafter, the delivery belts 11a are shiftable between the lowered inoperative position as shown in FIG. 1 and the elevated operative position where the upper run of each belt is positioned slightly above the feeding plane in which the veneer sheet 9 is moved by the feeding rolls 5 so that the veneer sheet 9, after it has been oriented into a straight position as will be described hereinafter, is moved by the delivery conveyer belts 11a in the arrow direction "C" which is perpendicular to the feeding direction "A". As seen clearly in FIG. 1, each delivery conveyer belt 11a extends outwardly beyond one end of the feeding rolls 5 so that the oriented veneer sheet can be moved by the delivery belts out from the feeding area which is defined by the feeding rolls 5. Each support member 11c carrying each delivery belt 11a is connected at the bottom thereof adjacent the pulleys 11b to piston rods of two fluid-operated cylinders 11d which are in turn fixed to the frame (not shown) of the orienting device 1, for shifting the delivery conveyer belt 11a to the aforementioned elevated position above the feeding plane, so that the sheet carried on the feeding rolls 5 is elevated clear thereof and simultaneously moved out from the feeding area in the arrow direction "C" by the delivery conveyer belts 11a.

At the downstream end of the feeding area there is disposed an orienting mechanism, which is generally designated by reference numeral 13, mounted tiltably to the frame (not shown) of the orienting device 1.

Figure 2:
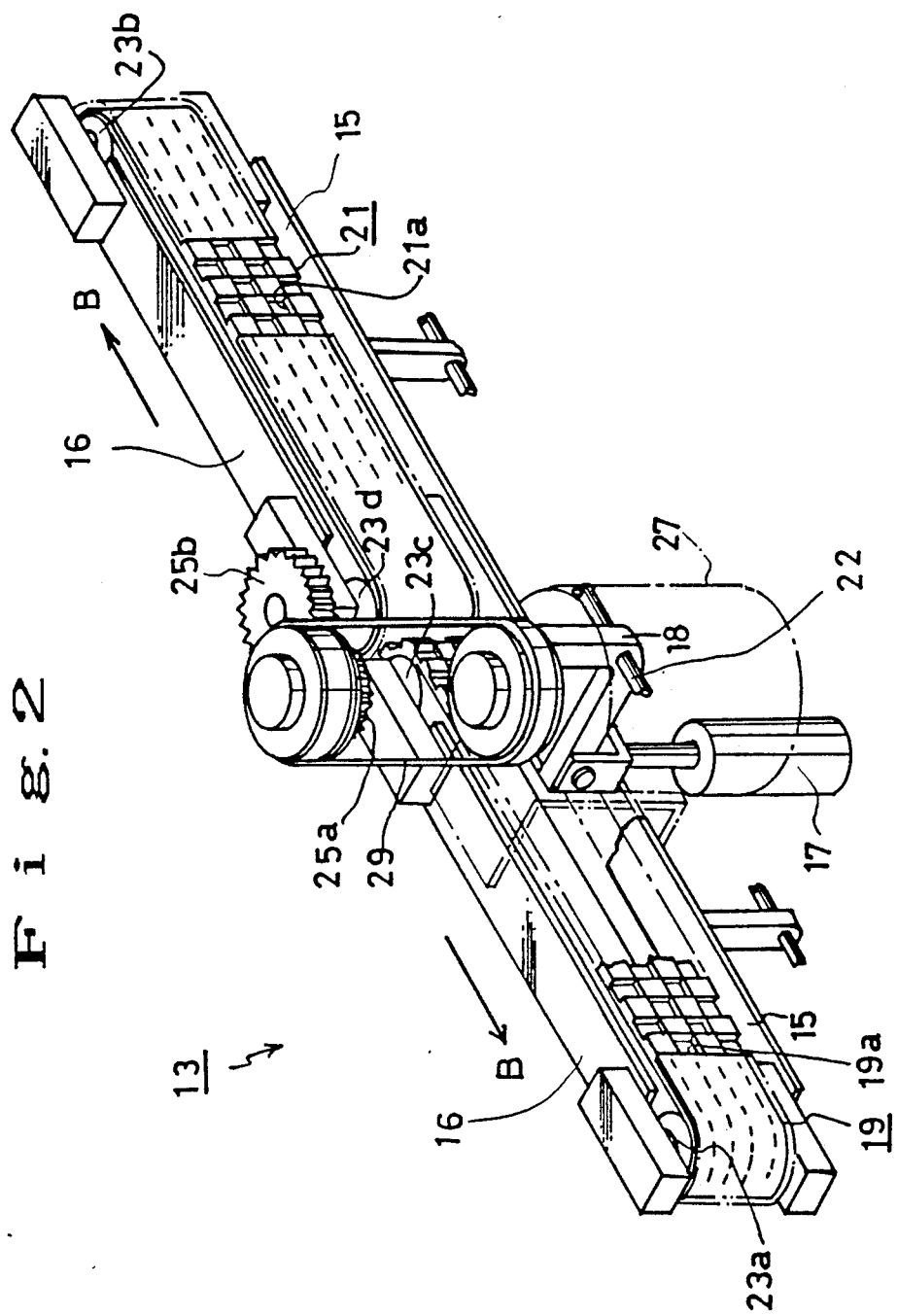
FIG. 2 is an enlarged perspective view showing an orienting mechanism including two endless belts and their associated support and drive in the device of FIG. 1.
Figure 3:
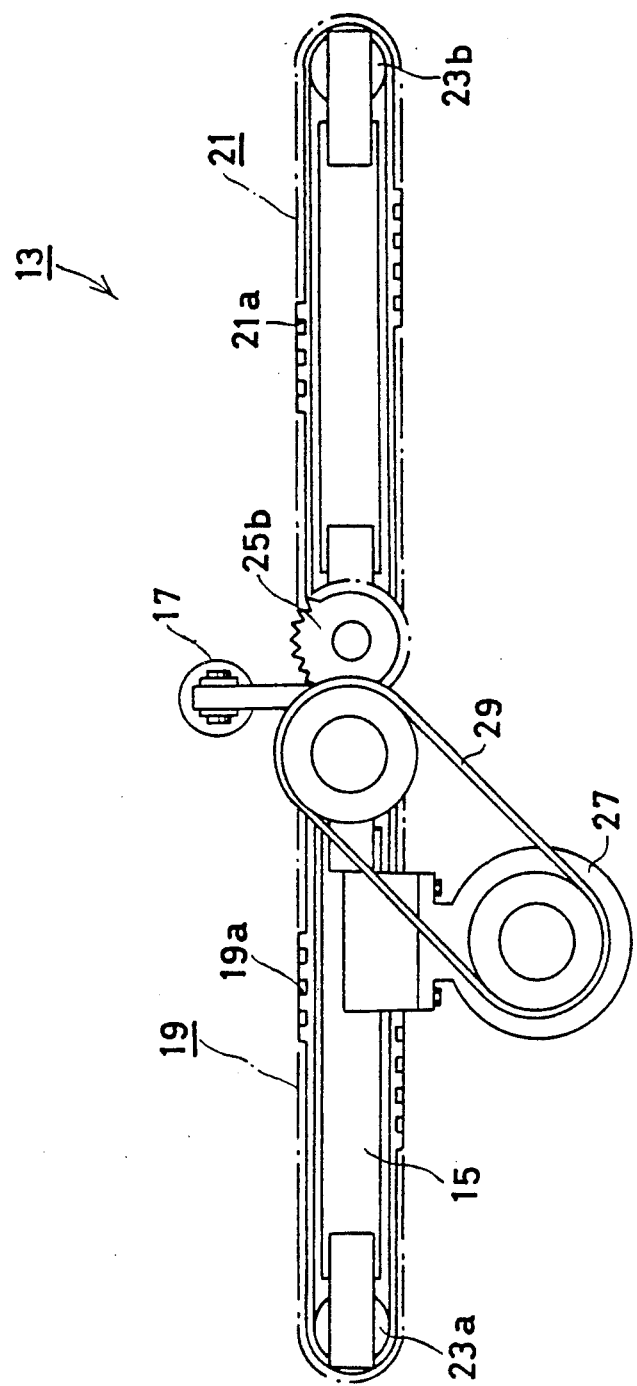
FIG. 3 is a plan view showing the orienting mechanism of FIG. 2.

Reference being made also to FIGS. 2 and 3, the orienting mechanism 13 includes frame members 15, 16 for mounting a pair of endless belts 19, 21 which are trained over and between pulleys 23a, 23c and 23b, 23d, respectively, which are in turn rotatably supported by the frame members 15, 16. The pulleys 23a, 23c, 23d and 23b are provided in alignment with each other with their axes in vertical positions so that the belts 19, 21 carried thereby present surfaces which are positioned in a plane perpendicular to the aforementioned feeding plane and with which the leading side or edge of an incoming veneer sheet fed by the feeding rolls 5 can be brought into contact engagement. The outer pulleys 23a, 23b are spaced at an interval which is greater than the width dimension of the veneer sheet 9 as measured across the feeding direction "A" and the inner pulleys 23c, 23d are located at a closely spaced interval. The pulley 23c is positively driven by a motor 27 through a drive belt 29 mounted between drive pulleys fixed on the shafts of the motor 27 and of the pulley 23c, respectively. The shafts carrying the inner pulleys 23c, 23d have fixedly mounted thereon gears 25a and 25b, respectively, which have the same number of teeth and are engaged with each other. Thus, the rotation of the pulley 23c causes the endless belts 19, 21 to run at the same speed. The motor 27 is rotated in the direction that causes the belts 19, 21 to rotate in such a way that the aforementioned surfaces engageable with the leading side of the veneer sheet 9 run away from each other as indicated by two parting arrows "B" (FIG. 2) both directed perpendicularly to the feeding direction "A". It is desirable that the outer surfaces of the endless belts 19, 21 should have such a high coefficient of friction when in contact engagement with a veneer sheet and also be so formed, e.g. corrugated as partially indicated by reference symbols 19a, 21a, so that a corner portion on the leading side of the sheet when moved into contact engagement therewith is pulled positively by the running surface of the belt.

As shown in FIG. 2, there is provided a cylinder 17 having its piston rod pivotally connected to one end of an L-shaped arm 18 which is swingably supported by a shaft 22 extending along the frame members 15, 16 and has the other end fixed to the bottom of the frame member 15, for tilting the endless belts 19, 21, as indicated by double-headed arrow "D" in FIG. 1, between the upright position in which the aforementioned surfaces of the endless belts 19, 21 face perpendicularly with respect to the feeding plane and the tilted position where the surfaces are retracted from the upright position away from engagement with the veneer sheet.

Figure 4:
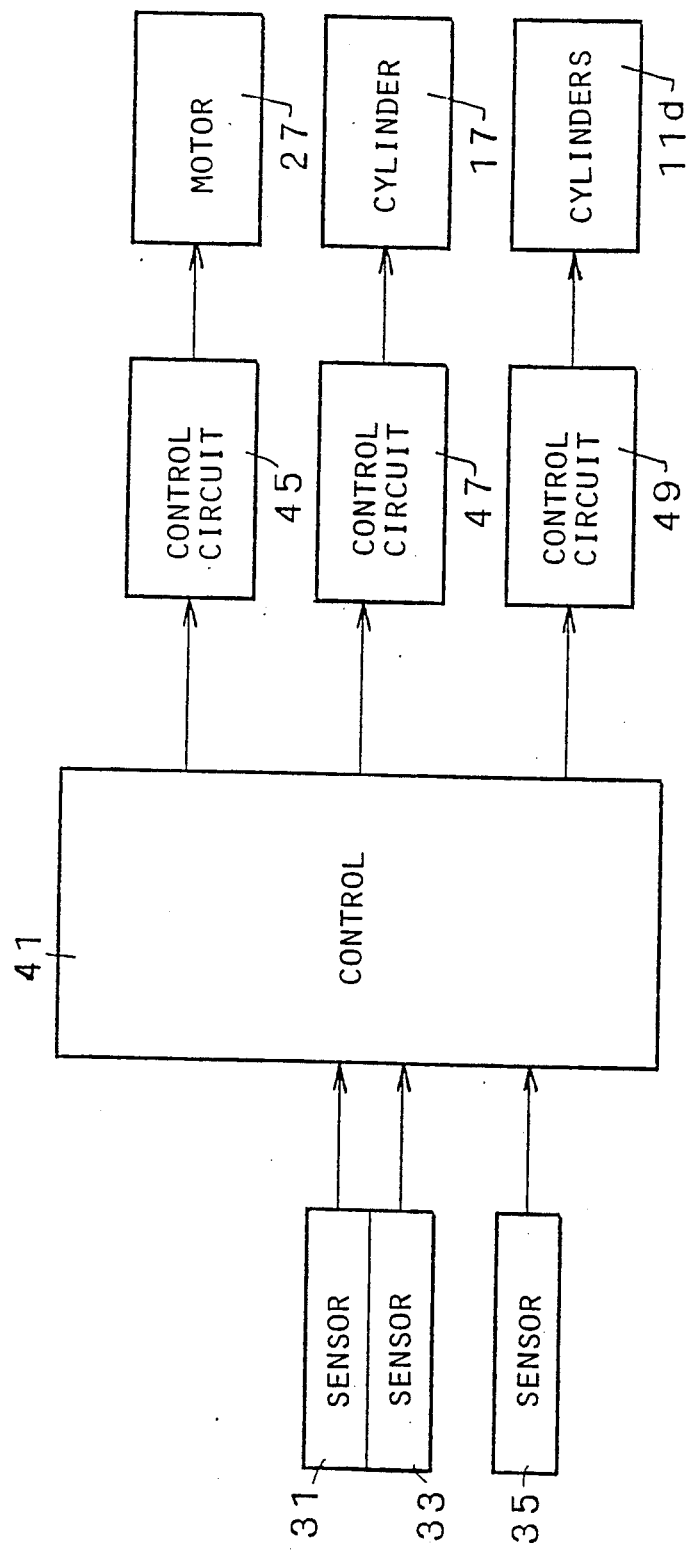
FIG. 4 is a block diagram showing a manner of controlling the operation of the orienting device of FIG. 1.

Referring back to FIG. 1 and also to FIG. 4, a pair of photoelectrically-operated sensors 31, 33 are located adjacent the outer pulleys 23a, 23b, respectively, at such positions that the veneer sheet 9 with its entire leading side in contact engagement with the belts 19, 21 can be detected by both of the sensors. Each sensor 31 (33) is of a known type which includes a light emitter 31a (33a) disposed slightly above the feeding plane and emitting a light beam and a light receiver 31b (33b) disposed slightly below the feeding plane in vertical alignment with its corresponding light emitter 31a (33a) so that the light beam from the emitter is received by the receiver when no intervening object such as any portion of the veneer sheet is present therebetween that blocks the light beam. Each of the sensors 31, 33 is operable to transmit a detect signal to a control 41 (FIG. 4) when the light beam is blocked by the veneer sheet 9. The control 41 is connected to control circuits 45, 47 and 49 for controlling the operation of the motor 27 and the cylinders 17 and 11d, as indicated in FIG. 4, and operable upon receiving the detect signals from both of the sensors, 31, 33 to provide control signals to the respective control circuits to stop the motor 27 and operate the cylinder 17 to shift the belts 19, 21 to their retracted position and also to operate the cylinders 11d so as to elevate the delivery conveyer belts 11a.

A similar sensor 35 is located adjacent the downstream end of the delivery conveyer belts 11a for detecting the veneer sheet 9 which has been moved by the conveyer belts 11a far enough away from the feeding area. The sensor 35 is operable upon thus detecting the veneer sheet 9 to provide a detect signal to the control 41 which then in turn transmits control signals to the respective control circuits 45, 47, 49 to restart the motor 27 and return the cylinders 17 and 11d to their original positions.

Figure 5:
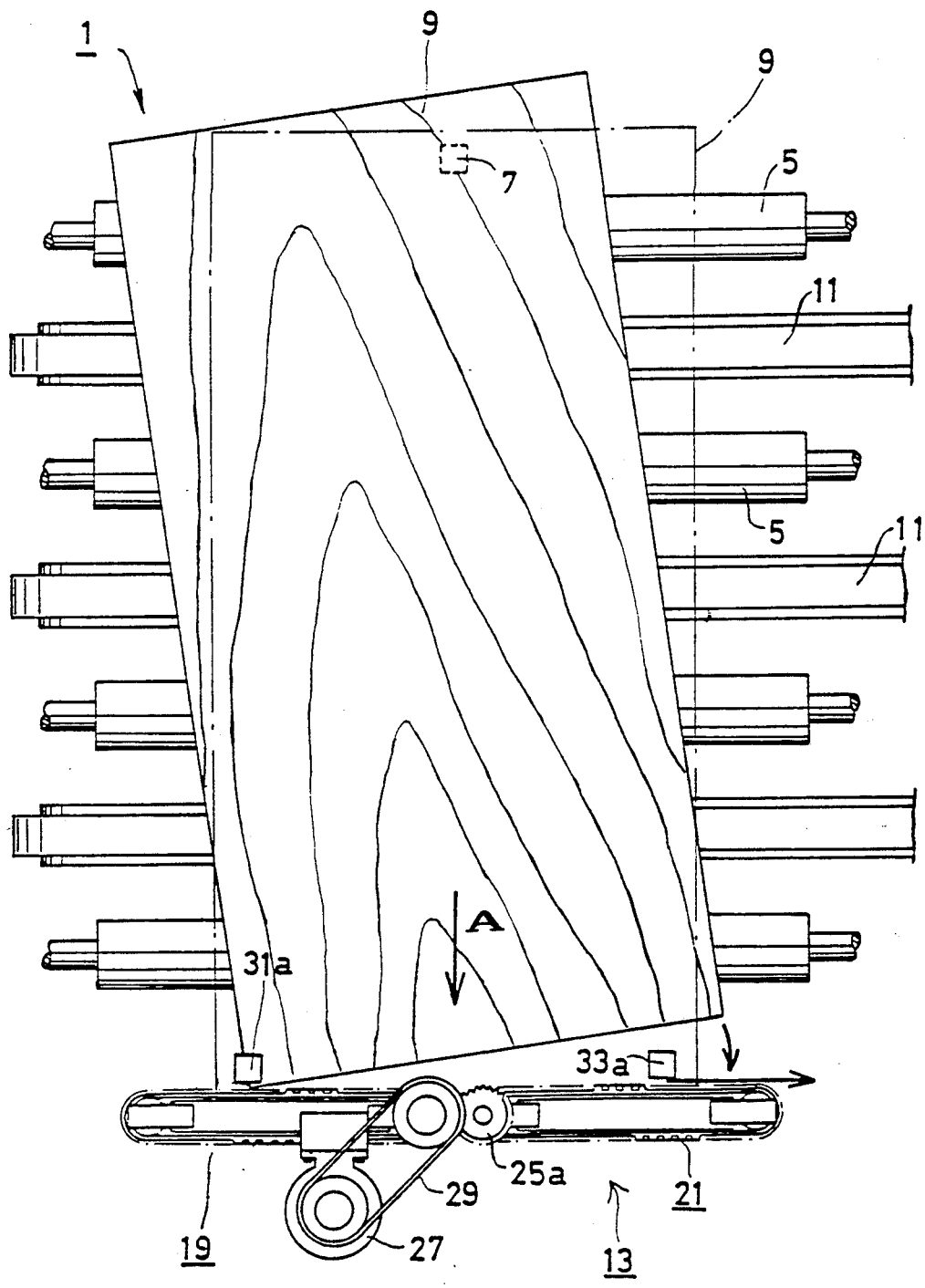
FIGS. 5 and 6 are illustrative plan views showing the manner in which a veneer sheet being fed in an inclined position is oriented into a straight position.
Figure 6:
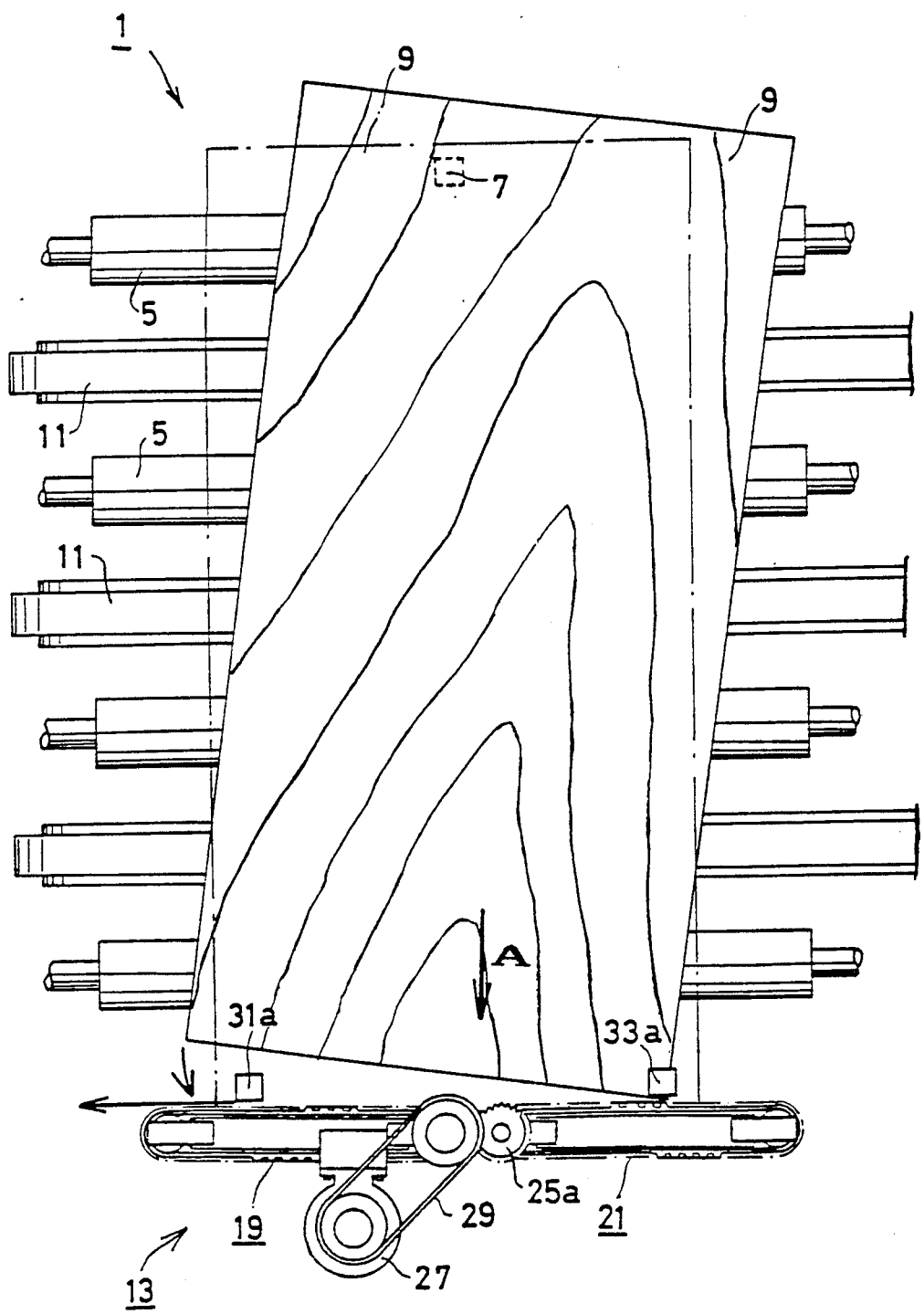

The following will describe the operation of the orienting device thus constructed with reference also to FIGS. 5 and 6.

When the veneer sheet 9 has entered into the device, it is so conditioned that its constantly running delivery conveyer belts 11a are located at their lowered inoperative position and the belts 19, 21 are running in the arrow direction "B" (FIG. 2) in their upright operative position.

Let us suppose that a veneer sheet 9 is fed in a position inclined in one way with its leading side or edge inclined with respect to the perpendicular to the feeding direction "A" so that left-hand or LH-side corner portion (as seen in FIG. 5) on the leading edge is brought into contact engagement with the belt 19, as shown in FIG. 5. If the corner in engagement with the belt 19 is then so positioned as to block the light beam from the emitter 31a as shown in FIG. 5, the sensor 31 is operated to transmit a detect signal to the control 41.

The veneer sheet 9 thus having one corner on the leading side thereof in engagement with the belt 19 is subjected to the force of that belt which pulls or moves the corner in the running direction "B" of the belt (FIG. 2), as well as to the feeding force acting on the sheet to move it forward in the direction "A". Because the above pulling force acts on the veneer sheet 9 to move the corner outwardly and perpendicularly with respect to the direction in which the feeding force acts on the same veneer sheet, the sheet is turned clockwise (as viewed in FIG. 5) until the entire leading side or edge of the sheet is brought into engagement with the belts 19, 21 where the veneer sheet is then longitudinally aligned with respect to the feeding direction "A", as indicated by phantom lines in FIG. 5. In this straight position of the sheet 9, the light beam of the other sensor 33 is blocked and, therefore, the sensor is operated to provide a detect signal to the control 41. In response to the detect signals from both of the sensors 31, 33, the control 41 is operated to provide control signals to the control circuits 45, 47, 49 for turning off the motor 27 to stop the running motion of the tilling frame of the belts 19, 21, operating the cylinder 17 to cause the belts 19, 21 to be tilted to its retracted position, and also operating the cylinders 11d to elevate the delivery conveyer belts 11a. Thus, the veneer sheet 9 is moved by the delivery belts 11a in the arrow direction "C" (FIG. 1). Because the leading side or edge is then released from its engagement with the belts 19, 21, the veneer sheet 9 can be moved out from the feeding area while maintaining its oriented straight position.

When the veneer sheet 9 has been moved far enough away from the feeding area to reach the position where the sheet is detected by the sensor 35 which then transmits a detect signal, the control 41 in response to this signal is operated to provide control signals to the control circuits 45, 47, 49 for actuating the cylinders 11d to lower the delivery conveyer belts 11a to their inoperative position, turning on the motor 27 to restart the rotation of the belts 19, 21, and actuating the cylinder 17 to shift the belts 19, 21 back to their original operative position. The orienting device 1 is thus ready for receiving the next veneer sheet to repeat the above orienting operation.

The illustration of FIG. 6 differs from that of FIG. 5 in that the veneer sheet 9 is fed in a position inclined in the other way and thus brought into contact engagement at the opposite right hand or RH-side corner with the belt 21 and the sheet is caused to be turned counterclockwise by the action of the pulling force on the corner in conjunction with the feeding force until it is oriented into a straight position as indicated by phantom lines.

Figure 7:
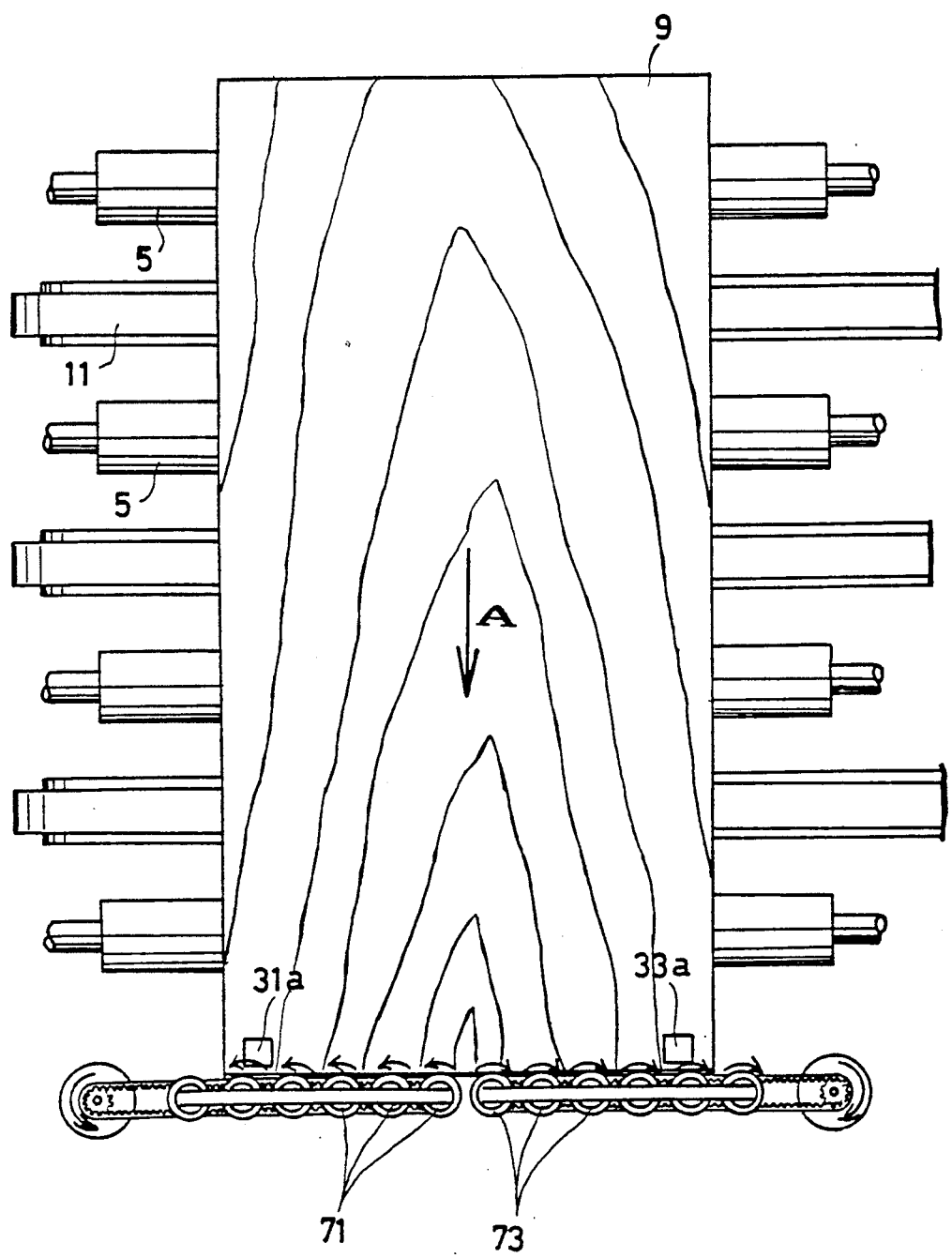
FIG. 7 is a plan view showing a modified embodiment of the orienting device according to the present invention.

Referring now to FIG. 7 showing a modified embodiment of the present invention, this differs from the first preferred embodiment in that the two belts 19, 21 are replaced by two sets of rollers 71, 73 disposed closely adjacent to each other with their axes in a plane perpendicular to the feeding plane so that the peripheral surfaces of the respective rollers present two surfaces which are contactable by the leading edge of the veneer sheet 9. As indicated by arrows, the rollers 71, 73 of the respective sets are rotated in such opposite directions that the above two surfaces (as viewed in FIG. 7) move away from each other, thus providing substantially the same effect as the oppositely running belts 19, 21 in the preferred embodiment. Each roller should desirably be clad with resilient material such as rubber which can offer a high coefficient of friction when in contact engagement with a corner of the veneer sheet. In the illustrated embodiment, the rollers of each set are driven by a motor by way of a drive belt.

Since the time required for a veneer sheet to be oriented properly after it has entered the feeding area is easily predictable, the time at which the motor 27 is turned off to stop the belts 19, 21 and the cylinders 11d and 17 are operated to raise the delivery belts 11b and to retract the belts 19, 21 can be controlled by means other than the sensors 31, 33. Referring to FIGS. 5 and 6, the reference numeral 7 designates a veneer sheet sensor (indicated by phantom lines) which is located at any convenient position in the feeding area in place of the sensors 31, 33 for detecting an incoming veneer sheet and transmitting a detect signal to the control 41, which then provides control signals to the control circuits 45, 47, 49 only after an elapse of a predetermined length of time to operate the motor 27 and the cylinders 17 and 11d in the same manner as when the sensors 31 and 33 are both operated by detecting the veneer sheet in the preferred embodiment.

Though not shown in the drawings, the delivery conveyer 11 may include upper and lower sets of belts which are adapted to hold and transfer an oriented veneer sheet in the direction "C". By so arranging, the orienting mechanism 13 need not be tilted back or retracted away from the engagement with the veneer sheet because the oriented position of the sheet can then be maintained successfully by the delivery belts which hold the sheet at its opposite faces.

Various arrangements may be contemplated to take the veneer sheet clear of the orienting mechanism to allow the sheet to be moved out from the orienting device toward the subsequent working station. For example, it may be so arranged ranged that the belts 19, 21 run constantly and the delivery conveyer belts 11a are elevated to a level where the veneer sheet is clear of the running belts. Alternatively, the belts 19, 21 may be lowered or tilted back to a level below the feeding plane so that veneer sheet can be delivered forward in the same direction as "A".

In a further modified embodiment, the delivery conveyer belts 11a may be replaced by a lifter which is adapted to pick up by vacuum each oriented veneer sheet for delivery.

As understood by those skilled in the art, although the above embodiments have been described as applied to the handling of a thin, floppy veneer sheet, the present invention is equally applicable to orienting a rigid board such as plywood panel.

While the present invention has been described and illustrated with reference to the desired embodiment and other possible modifications, it is to be understood that the invention can be changed or modified in various ways without departing from the spirit or scope thereof.

What is claimed is:

1. A device for orienting a rectangular-shaped sheet into a straight position with the leading edge thereof presented in substantially perpendicular relation to a forward direction in which the sheet is fed, comprising:
   means providing a feeding area of said device for feeding the sheet in said forward feeding direction;
   first means disposed at the downstream end of said feeding area for orienting the sheet in conjunction with the feeding force imparted to the sheet by said feeding means;
   second means disposed at the downstream end of said feeding area in closely adjacent relation to said first orienting means for orienting the sheet in conjunction with said feeding force;
   said first orienting means having a working surface contactable by one of the corners on said leading edge of the sheet when fed by said feeding means in a position inclined in one way, and said second orienting means having a similar working surface contactable by the other corner of said leading edge of the sheet when fed in a position inclined in the other way; and
   drive means for driving each of said working surfaces of said first and second orienting means in such opposite directions that said working surfaces move away from each other, whereby the sheet having either one corner on the leading edge thereof brought into contact with its said corresponding working surface is caused to be turned into said straight position by the feeding force acting on the sheet to move it forward and by the force of said corresponding working surface acting on the corner of the sheet to move it in direction substantially perpendicular to that of the feeding force and away from said other working surface.

2. A device according to claim 1, wherein said first and second orienting means includes a pair of endless belts each mounted in a loop by pulley means in such a way that a portion of the belt surface faces said feeding area and allows the leading edge of the sheet to contactably engage therewith, said endless belts being movable in said opposite directions so that said portions thereof move away from each other.

3. A device according to claim 2, wherein at least the outer surface of the loop of each endless belt is made of rubber.

4. A device according to claim 2, further including delivery conveyer means operable when the sheet has been oriented into said straight position for moving the sheet thus oriented out of said feeding area.

5. A device according to claim 4, wherein said endless belts are shiftable integrally between a first position wherein said positions of the belt surfaces face said feeding area and allow the leading edge of the sheet to contactably engage therewith and a second position wherein said portions of the belt surfaces are out of engagement with the leading edge of the sheet.

6. A device according to claim 5, wherein said drive means stop said endless belts when said sheet has been oriented into its said straight position.

7. A device according to claim 5, which further includes means for integrally shifting said endless belts between their said first and second positions, and said drive means stops said endless belts just before they are moved from their said first position to said second position.

8. A device for orienting a rectangular-shaped sheet into a straight position with the leading edge thereof presented in substantially perpendicular relation to a forward direction in which the sheet is fed, comprising:
   means providing a feeding area of said device for feeding the sheet in said forward feeding direction;
   first means disposed at the downstream end of said feeding area for orienting the sheet in conjunction with the feeding force imparted to the sheet by said feeding means;
   second means disposed at the downstream end of said feeding area in closely adjacent relation to said first orienting means for orienting the sheet in conjunction with said feeding force;
   said first orienting means having a working surface contactable by one of the corners on said leading edge of the sheet when fed by said feeding means in a position inclined in one way, and said second orienting means having a similar working surface contactable by the other corner of said leading edge of the sheet when fed in a position inclined in the other way;
   said working surfaces of said first and second orienting means being movable in such opposite directions that said working surfaces move away from each other, whereby the sheet having either one corner on the leading edge thereof brought into contact with its said corresponding working surface is caused to be turned into said straight position by the feeding force acting on the sheet to move it forward and by the force of said corresponding working surface acting on the corner of the sheet to move it in direction substantially perpendicular to that of the feeding force and away from said other working surface, said first and second orienting means having a pair of endless belts each mounted in a loop by pulley means in such a way that a portion of each belt surface faces said feeding area and allows the leading edge of the sheet to contactably engage therewith, said endless belts being movable in said opposite directions so that said portions thereof move away from each other, at least the outer surface of the loop of each endless belt being formed corrugated.

9. A device for orienting a rectangular-shaped sheet into a straight position with the leading edge thereof presented in substantially perpendicular relation to a forward direction in which the sheet if fed, comprising:
   means providing a feeding area of said device for feeding the sheet in said forward feeding direction;
   first means disposed at the downstream end of said feeding area for orienting the sheet in conjunction with the feeding force imparted to the sheet by said feeding means;
   second means disposed at the downstream end of said feeding area in closely adjacent relation to said first orienting means for orienting the sheet in conjunction with said feeding force;
   said first orienting means having a working surface contactable by one of the corners on said leading edge of the sheet when fed by said feeding means in a position inclined in one way, and said second orienting means having a similar working surface contactable by the other corner of said leading edge of the sheet when fed in a position inclined in the other way;
   said working surfaces of said first and second orienting means being movable in such opposite directions that said working surfaces move away from each other, whereby the sheet having either one corner on the leading edge thereof brought into contact with its said corresponding working surface is caused to be turned into said straight position by the feeding force acting on the sheet to move it forward and by the force of said corresponding working surface acting on the corner of the sheet to move it in direction substantially perpendicular to that of the feeding force and away from said other working surface, said first and second orienting means having a pair of endless belts each mounted in a loop by pulley means in such a way that a portion of each belt surface faces said feeding area and allows the leading edge of the sheet to contactably engage therewith, said endless belts being movable in said opposite directions so that said portions thereof move away from each other, and delivery conveyer means operable when the sheet has been oriented into said straight position for moving the sheet thus oriented out of said feeding area in a direction which is substantially perpendicular to said feeding direction.

10. A device for orienting a rectangular-shaped sheet into a straight position with the leading edge thereof presented in substantially perpendicular relation to a forward direction in which the sheet is fed, comprising:
    means providing a feeding area of said device for feeding the sheet in said forward feeding direction;
    first means disposed at the downstream end of said feeding area for orienting the sheet in conjunction with the feeding force imparted to the sheet by said feeding means;
    second means disposed at a downstream end of said feeding area in closely adjacent relation to said first orienting means for orienting the sheet in conjunction with said feeding force;
    said first orienting means having a working surface contactable by one of the corners on said leading edge of the sheet when fed by said feeding means in a position inclined in one way, and said second orienting means having a similar working surface contactable by the other corner of said leading edge of the sheet when fed in a position inclined in the other way;
    said working surfaces of said first and second orienting means being movable in such opposite directions that said working surfaces move away from each other, whereby the sheet having either one corner on the leading edge thereof brought into contact with its said corresponding working surface is caused to be turned into said straight position by the feeding force acting on the sheet to move it forward and by the force of said corresponding working surface acting on the corner of the sheet to move it in direction substantially perpendicular to that of the feeding force and away from said other working surface, said first and second orienting means having two sets of rotatable rollers disposed closely adjacent to each other with their axes in a plane perpendicular to the feeding direction so that the peripheral surfaces of the rollers of each set provide each said working surface contactable by either one of the corners of the leading edge of the sheet, the rollers of one set being rotatable in such direction that the working surface provided by the peripheral surfaces thereof move oppositely away from the working surfaces provided by the peripheral surface of the rollers of the other set.

* * * * *

UNITED STATES PATENT AND TRADEMARK OFFICE
CERTIFICATE OF CORRECTION

PATENT NO. : 5,050,857
DATED : September 24, 1991
INVENTOR(S) : Teruaki Aoto

It is certified that error appears in the above-identified patent and that said Letters Patent is hereby corrected as shown below:

Col. 1, line 27, "Publication" should read --publication--.

Col. 5, line 63, after the word "the" and before the word "belts" insert the words --tilting frame of the--.

Col. 6, line 20, "right hand" should read --right-hand--.

Col. 7, line 8, after "arranged", delete "ranged".

Col. 5, line 62, after "the" (2nd occurrence) and before "belts" delete --tilting frame of the--, Signed and Sealed this Thirteenth Day of April, 1993

Attest:

STEPHEN G. KUNIN

*Attesting Officer*  *Acting Commissioner of Patents and Trademarks*